No. 619,065. Patented Feb. 7, 1899.
J. E. BJORNSEN.
FISH NET.
(Application filed Feb. 23, 1898.)
(No Model.)
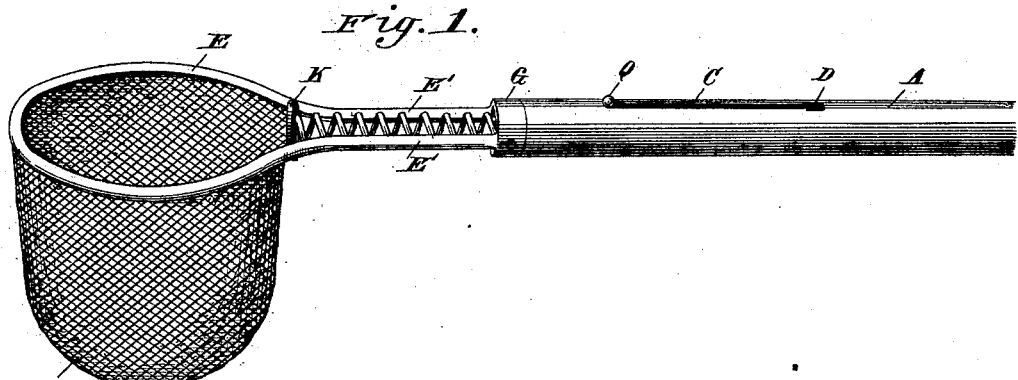
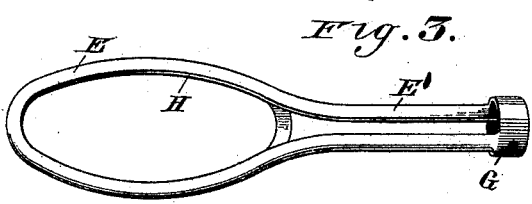
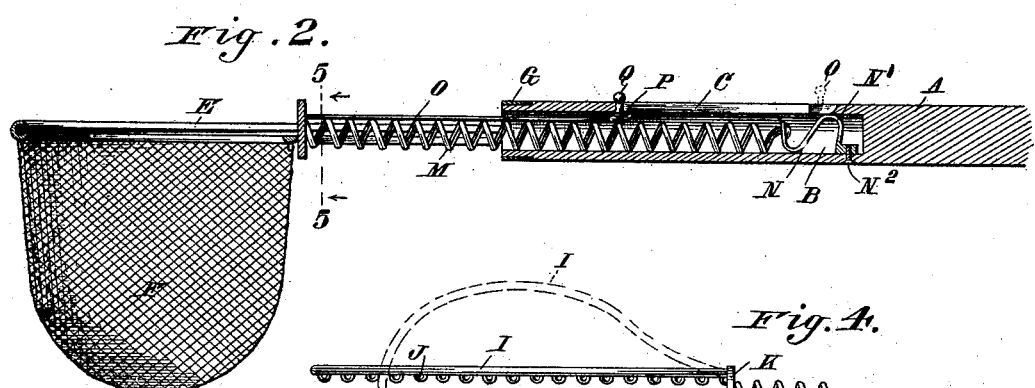
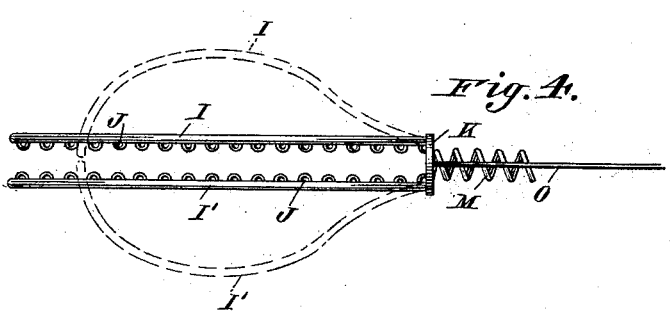
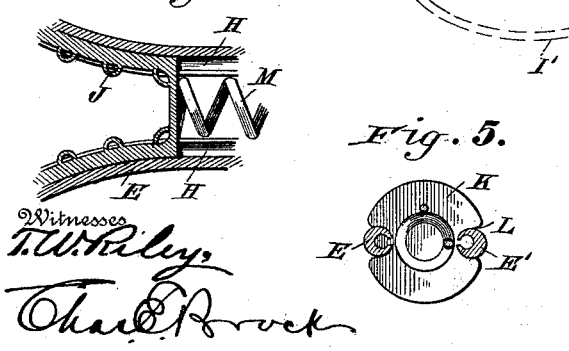
Witnesses
T. W. Riley,
Chas. P. Brock.
Inventor
John E. Bjornsen,
by O'Mara & Co.
Attorneys
THE NORRIS PETERS CO., PHOTO-LITHO., WASHINGTON, D. C.

UNITED STATES PATENT OFFICE.

JOHN EMANUEL BJORNSEN, OF PERTH AMBOY, NEW JERSEY.

FISH-NET.

SPECIFICATION forming part of Letters Patent No. 619,065, dated February 7, 1899.

Application filed February 23, 1898. Serial No. 671,405. (No model.)

*To all whom it may concern:*

Be it known that I, JOHN EMANUEL BJORNSEN, a citizen of the United States, residing at Perth Amboy, in the county of Middlesex and State of New Jersey, have invented a new and useful Fish-Net, of which the following is a specification.

My invention relates to fish-nets, especially to that class of fish-nets operated by hand, consisting, primarily, of a bag-net mounted on the inner end of a handle. In the use of such nets difficulty has been encountered in retaining the capture in the net, especially when the capture consists of frogs or crabs, it having been found difficult after the net has been thrown over a frog to pick the frog up in the net without giving him a chance to jump out. Substantially the same difficulty has been encountered with crabs, there being a tendency on the part of the crab to crawl out of the net before it can be raised from the water to the boat or pier upon which the operator is located.

The object of my invention is to overcome these difficulties; and with this object in view my invention consists in a net of the class described provided with means whereby the mouth of the net may be closed after each operation to prevent the escape of the contents.

My invention further consists in the improved construction, arrangement, and combination of parts hereinafter more fully described and afterward specifically pointed out in the claims.

In order to enable others skilled in the art to which my invention most nearly appertains to make and use the same I will now proceed to describe its construction and operation, reference being had to the accompanying drawings, forming part of this specification, in which—

Figure 1 is a perspective view of a net constructed in accordance with my invention, with the mouth of the bag closed by means of my improved cover. Fig. 2 is a vertical longitudinal section through the same. Fig. 3 is a detail perspective view of the frame of the bag-net detached from the handle. Fig. 4 is a view in plan of the supports for the mouth-covering net and a portion of their operating mechanism, their position after being sprung into place in the mouth bag-net being indicated in dotted lines. Fig. 5 is a transverse vertical section on the line 5 5 of Fig. 2, looking in the direction of the arrow. Fig. 6 is a fragmentary detail view, being a horizontal section through a portion of the bag-net frame and the mouth-closing net-frame and operating-spring.

Like letters of reference mark the same parts wherever they occur in the various figures of the drawings.

Referring to the drawings by letters, A indicates the handle of my improved net, which is of the usual construction, except that it is bored longitudinally at the net end, as at B, a longitudinal slot C opening outward from the top of the handle and enlarged to the form of a square opening at its outer end, as at D.

E indicates the frame of the usual bag-net F, said frame having the usual form, except that its inner ends are extended parallel with each other, as at E', and secured at their outer ends to a ferrule G, by means of which it is secured upon the end to the handle A.

H H indicate an undercut slot in the inner face of the bag-net frame E, extending from end to end thereof.

I I' indicate two flexible wires provided with eyes J on one side, in which a net, made of rubber or other elastic threads, may be secured. These wires are normally straight and are secured at one end to a plate or disk K, which is notched in each side, as at L, to permit of its being placed in position between the straight ends E' of the bag-net frame E with the capacity of sliding on said wires, the sides of the frame resting in said side slots. M indicates a spiral spring secured to the inner side of the plate or disk K and extending into the bore or chamber B of the handle A to near its rear end, where it is secured to a bent spring N, which extends upward and rests at N' directly under the square opening D at the end of the slot C, the inner end of the spring N being secured by a screw $N^2$. A rod O is also secured to the disk or plate K and extends into the bore or chamber B of the handle A, a block or shoe P being secured to its inner end, from which projects a pin Q through the slot C. The shoe or block P is square or rectangular and of a size to fit the square opening D at the end of the slot C.

When the parts are assembled in position for use, the plate K rests against the end of the handle A and the ferrule G, the shoe P fitting in the square or rectangular opening D at the inner end of the slot C, as shown in dotted lines in Fig. 2, being held in position in said opening by the upper bend N' of spring N. The operator having thrown the net over a frog or having dipped a crab or fish into the bag presses the pin Q and block or shoe P inward, relieving the spiral spring M of the restraint of the rod O. The spring M will now expand, throwing the plate or disk K in its outer position, as illustrated in Figs. 1 and 2, carrying with it the rod O, the outward movement being limited by the length of the slot C and stopped by the pin Q coming in contact with the outer end wall of said slot. During this movement of the plate K it will force the wires I and I' forward, the wires I and I' moving in the opposite sides of the undercut slot H of the bag-net frame E and following the groove of said frame until they assume the shape illustrated in dotted lines in Fig. 4, their outer ends meeting at the outer end of the bag-net frame. During this movement the elastic net secured in the eyes J on the inner sides of the wires I and I' will stretch across the mouth of the bag-net, effectually closing it and confining its contents and preventing escape therefrom.

To empty the net, it is only necessary to move the pin Q to the opposite end of the slot C, carrying the shoe or block P with it, which by contact with the upper bend N' of the bent spring N will be forced into the square or rectangular opening at the inner end of the slot C, thus securely holding the parts in their set position ready for a second operation, the disk K being drawn inward by the movement of the rod O pressing the spiral spring M and withdrawing the wires I and I' into those portions of the undercut slot H of the bag-net frame contained in the inner sides of the straight ends E and E' of said frame.

The advantages attending the use of my invention will be obvious, and while I have illustrated and described what I consider to be efficient means for carrying out my invention I do not wish to be understood as restricting myself to the exact details of construction, but hold that any slight changes or variations, such as might suggest themselves to the ordinary mechanic, will properly fall within the limit and scope of my invention.

Having thus fully described my invention, what I claim as new, and desire to secure by Letters Patent of the United States, is—

1. A hand fish-net comprising a handle, an expanded frame and a bag-net secured thereto, in combination with a supplementary expansible frame carrying a net, and means for moving the supplementary net into position to close the mouth of the bag-net, substantially as described.

2. A hand fish-net comprising a handle, an expanded frame and a bag-net secured thereto, in combination with a mouth-closing frame and net, and a spring for normally holding the mouth-closing net in position in the bag-net frame, substantially as described.

3. A hand fish-net comprising a handle, an expanded frame and a bag-net secured thereto, in combination with a mouth-closing net comprising two flexible wires, an elastic net connecting them, a disk to which said wires are secured, a spring for throwing the disk into its normal outer position, and means for causing the wires to be expanded during their forward motion into position coinciding with the shape of the bag-net frame to close its mouth, substantially as described.

4. The combination with the handle, a bag-net frame secured at the end thereof, consisting of the expanded outer portion and parallel ends provided, on their inner sides, with a continuous undercut groove, a disk mounted to slide between the parallel ends of the bag-net frame, a pair of flexible wires located in the undercut groove of the bag-net frame and secured, at their inner ends, to the disk, an elastic net secured to the inner sides of the flexible wires, and a spring operating upon the disk to normally hold it in its outer position in which the flexible wires occupy the undercut groove on the inner face of the expanded portion of the bag-net frame and the net connecting said wires closes the mouth of the bag-net, substantially as described.

5. The combination with the handle A provided with chamber B, and slot C with rectangular end opening D, the bag-net frame consisting of an expanded portion E and parallel arms E', the inner ends of said arms being secured to the end of the handle and the whole bag-net frame being provided with the undercut groove H in its inner surface, the disk K fitted to slide between the arms E', the flexible wires I and I' located in the undercut groove H connected, at their inner ends, to the disk K, the elastic net secured between the flexible wires I and I', spiral spring N seated in the chamber of the handle and secured, at its outer end, to the disk K, the rod O secured to the disk K and entering the chamber in the handle and the block P in the inner end of said rod and the pin Q from the block through the slot C, substantially as described.

6. The combination with the hollow handle A provided with the slot C and rectangular end recess D, the disk K, the spiral spring M secured to the disk A and passing into the chamber in the handle, the bent spring N to which the inner end of the spiral spring is secured, said spring N being provided with the upper bend N' and secured by screw N², the rod O secured to the disk K and passing into the chamber B of the handle, the rectangular block or shoe on the inner end of said handle of a shape to fit the rectangular recess D, and the pin Q passing from said shoe or block through the slot C, substantially as described.

JOHN EMANUEL BJORNSEN.

Witnesses:
 THOMAS M. THICKSTUN,
 ADRIAN LYON.